(12) United States Patent (10) Patent No.: US 12,568,350 B2
Buddingh (45) Date of Patent: Mar. 3, 2026

(54) METHOD FOR GEOLOCATING A COMMUNICATION TOWER USING CELL ID AND INTERPOLATION

(71) Applicant: DISH Wireless L.L.C., Englewood, CO (US)

(72) Inventor: Seth Buddingh, Littleton, CO (US)

(73) Assignee: DISH Wireless L.L.C., Englewood, CO (US)

( * ) Notice: Subject to any disclaimer, the term of this patent is extended or adjusted under 35 U.S.C. 154(b) by 340 days.

(21) Appl. No.: 18/393,649

(22) Filed: Dec. 21, 2023

(65) Prior Publication Data

US 2025/0211966 A1 Jun. 26, 2025

(51) Int. Cl.
*H04L 1/00* (2006.01)
*H04M 3/22* (2006.01)
*H04W 8/08* (2009.01)
*H04W 64/00* (2009.01)
(52) U.S. Cl.
CPC ........... *H04W 8/08* (2013.01); *H04M 3/2218* (2013.01); *H04W 64/00* (2013.01)
(58) Field of Classification Search
CPC ...... H04W 8/08; H04W 64/00; H04M 3/2218
USPC ...................................... 455/456.1
See application file for complete search history.

(56) References Cited

U.S. PATENT DOCUMENTS

| | | | | |
|---|---|---|---|---|
| 2011/0250903 | A1* | 10/2011 | Huang | H04W 24/00 |
| | | | | 455/456.1 |
| 2011/0256881 | A1* | 10/2011 | Huang | H04W 4/02 |
| | | | | 455/456.1 |
| 2014/0244167 | A1* | 8/2014 | Reynolds | G01S 19/396 |
| | | | | 701/518 |
| 2023/0319590 | A1* | 10/2023 | Rajpoot | H04B 17/318 |
| | | | | 370/252 |

FOREIGN PATENT DOCUMENTS

CA 2876348 A1 * 12/2013 ............. H04W 4/90

* cited by examiner

*Primary Examiner* — Tanmay K Shah
(74) *Attorney, Agent, or Firm* — Capitol City TechLaw; Jasbir Singh

(57) ABSTRACT

A method for determining the geolocation of a communication tower involves receiving a cell ID for a network cell from a data record and querying geolocation data sources for the tower's geolocations using the cell ID. In cases where the querying fails to retrieve the geolocations based on the cell ID, the method sets the geolocations to be between the previous cell ID geolocations and the following cell ID geolocations. The method then associates the cell ID with the communication tower based on the determined geolocations and pushes the geolocations into a large-scale data storage using a data processing platform. This method enables accurate determination of the physical of a communication tower even when geolocation data sources do not provide the necessary information.

20 Claims, 4 Drawing Sheets

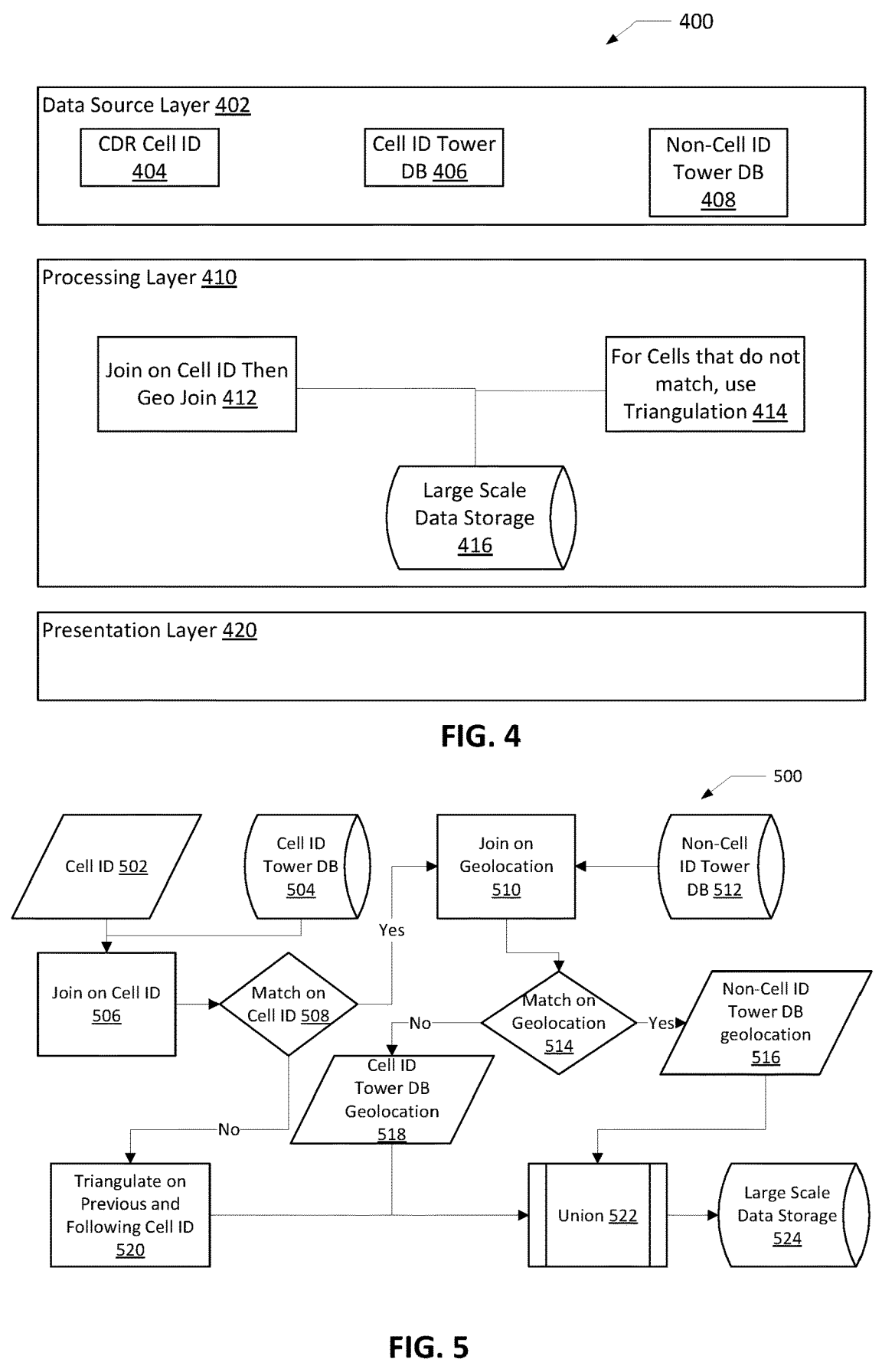

400

Data Source Layer 402

CDR Cell ID
404

Cell ID Tower
DB 406

Non-Cell ID
Tower DB
408

Processing Layer 410

Join on Cell ID Then
Geo Join 412

For Cells that do not
match, use
Triangulation 414

Large Scale
Data Storage
416

Presentation Layer 420

Cell ID 502

Cell ID
Tower DB
504

Join on
Geolocation
510

Non-Cell
ID Tower
DB 512

Join on Cell ID
506

Match on
Cell ID 508

Yes

Match on
Geolocation
514

Non-Cell ID
Tower DB
geolocation
516

No

Yes

Cell ID
Tower DB
Geolocation
518

No

Triangulate on
Previous and
Following Cell ID
520

Union 522

Large Scale
Data Storage
524

FIG. 5

METHOD FOR GEOLOCATING A COMMUNICATION TOWER USING CELL ID AND INTERPOLATION

FIELD

The present teachings provide a method for determining and storing the geographical location of communication towers using cell IDs and geolocation data sources.

BACKGROUND

However, there can be multiple cells on a tower and the data in public cell-ID databases, such as, OpenCellID is crowd sourced and cannot be relied on to be exact. This includes using a different data source including the latitude and longitude of all towers in the US including monopoles (towers with one cell on them), even though the different data source does not include or record cell IDs.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In some aspects, the techniques described herein relate to a method for determining a latitude and a longitude of a communication tower, the method including: receiving a cell ID for a network cell from a data record; querying one or more geolocation data sources for a geolocation of the communication tower using the cell ID; when the querying fails to retrieve the geolocation based on the cell ID, setting the geolocation to be between a previous cell ID geolocation and a following cell ID geolocation; associating the cell ID with the communication tower based on the geolocation; and pushing an association of the cell ID and the geolocation into a large-scale data storage using a data processing platform.

In some aspects, the techniques described herein relate to a method, further including: representing the geolocation geographically on a map; and attributing a usage to a roaming partner based on the cell ID in data records and aggregating the usage to get a roaming percentage.

In some aspects, the techniques described herein relate to a method, wherein the cell ID for the network cell is included in a Call Data Record (CDR).

In some aspects, the techniques described herein relate to a method, wherein the setting includes: determining a previous cell ID and a following cell ID from the CDR, retrieving the previous cell ID geolocation and the following cell ID geolocation, and setting the geolocation to a midpoint of the previous cell ID geolocation and the following cell ID geolocation.

In some aspects, the techniques described herein relate to a method, wherein one of the one or more geolocation data sources includes records associated with cell IDs.

In some aspects, the techniques described herein relate to a method, wherein one of the one or more geolocation data sources includes records not associated with cell IDs, and the querying the one of the one or more geolocation data sources is based on an estimated latitude and an estimated longitude of the communication tower.

In some aspects, the techniques described herein relate to a method, wherein the one or more geolocation data sources include a geolocation data source including the cell ID.

In some aspects, the techniques described herein relate to a method, wherein the one or more geolocation data sources includes multiple geolocation data sources and the method further including uniting the geolocation from the multiple geolocation data sources to form the geolocations of the pushing.

In some aspects, the techniques described herein relate to a method, wherein a first data source of the multiple geolocation data sources includes first records associated with cell IDs, wherein a second data source of the multiple geolocation data sources includes second records not associated with the cell IDs, and the querying includes querying the first records with the cell ID and querying the second records based on a first data source latitude and a first data source longitude.

In some aspects, the techniques described herein relate to a method, wherein the communication tower belongs to a roaming partner.

In some aspects, the techniques described herein relate to a system to determine a latitude and a longitude of a communication tower, the system including a data processing platform configured to: receive a cell ID for a network cell from a data record; query one or more geolocation data sources for a geolocation of the communication tower using the cell ID; when the query fails to retrieve the geolocation based on the cell ID, set the geolocation to be between a previous cell ID geolocation and a following cell ID geolocation; associate the cell ID with the communication tower based on the geolocation; and push the geolocation into a large-scale data storage.

In some aspects, the techniques described herein relate to a system, wherein the data processing platform is further configured to represent the geolocation geographically on a map; and attribute a usage to a roaming partner based on the cell ID in data records and aggregating the usage to get a roaming percentage.

In some aspects, the techniques described herein relate to a system, wherein the cell ID for the network cell is included in a Call Data Record (CDR).

In some aspects, the techniques described herein relate to a system, wherein the data processing platform is further configured to determine a previous cell ID and a following cell ID from the CDR, retrieve the previous cell ID geolocation and the following cell ID geolocation, and set the geolocation to a midpoint of the previous cell ID geolocation and the following cell ID geolocation.

In some aspects, the techniques described herein relate to a system, wherein one of the one or more geolocation data sources includes records associated with cell IDs.

In some aspects, the techniques described herein relate to a system, wherein one of the one or more geolocation data sources includes records not associated with cell IDs, and the data processing platform is further configured to query the one of the one or more geolocation data sources based on an estimated latitude and an estimated longitude of the communication tower.

In some aspects, the techniques described herein relate to a system, wherein the one or more geolocation data sources include a geolocation data source including the cell ID.

In some aspects, the techniques described herein relate to a system, wherein the one or more geolocation data sources includes multiple geolocation data sources and the data processing platform is further configured to unite the geolocation from the multiple geolocation data sources to form the geolocations of the push.

In some aspects, the techniques described herein relate to a system, wherein a first data source of the multiple geolocation data sources includes first records associated with cell IDs, wherein a second data source of the multiple geolocation data sources includes second records not associated with the cell IDs, and the data processing platform is further configured to query the first records with the cell ID and query the second records based on a first data source latitude and a first data source longitude.

In some aspects, the techniques described herein relate to a system, wherein the communication tower belongs to a roaming partner.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

FIG. 4 illustrates a logical diagram of a system to determine a geolocation of a communications tower, according to various embodiments.

FIG. 5 illustrates a logical flow diagram of a system to determine a geolocation of communications tower included in a cellular network according to various embodiments.

Figure 1:
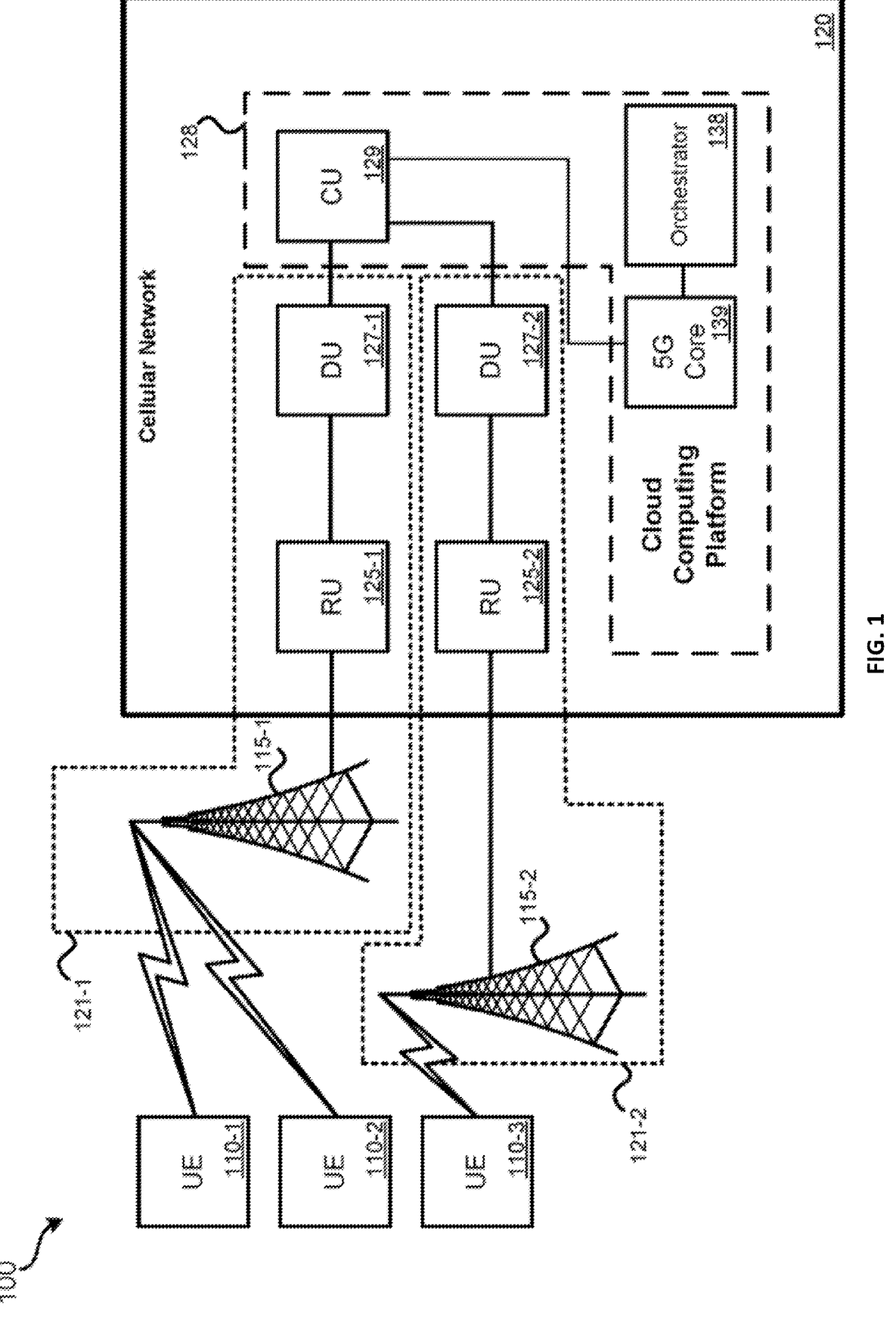
FIG. 1 illustrates an embodiment of a hybrid cloud cellular network.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Introduction

FIG. 1 illustrates a block diagram of a hybrid cellular network system ("system 100"). System 100 can include a 5G New Radio (NR) cellular network; other types of cellular networks, such as 6G, 7G, etc., may also be possible. System 100 can include: UE 110 (UE 110-1, UE 110-2, UE 110-3); structure 115; cellular network 120; radio units 125 ("RUs 125"); distributed units 127 ("DUs 127"); centralized unit 129 ("CU 129"); 5G core 139; and orchestrator 138. FIG. 1 represents a component-level view. In an open radio access network (O-RAN), most components, except for components that need to receive and transmit RF, can be implemented as specialized software executed on general-purpose hardware or servers. For at least some components, the hardware may be maintained by a separate cloud-service computing platform provider. Therefore, the cellular network operator may operate some hardware (such as, RUs and local computing resources on which DUs are executed) connected with a cloud-computing platform on which other cellular network functions, such as the core and CUs are executed.

UE 110 can represent various types of end-user devices, such as cellular phones, smartphones, cellular modems, cellular-enabled computerized devices, sensor devices, robotic equipment, IoT devices, gaming devices, access points (APs), or any computerized device capable of communicating via a cellular network. More generally, UE 110 can represent any type of device that has an incorporated 5G interface, such as a 5G modem. Examples can include sensor devices, Internet of Things (IoT) devices, manufacturing robots, unmanned aerial (or land-based) vehicles, network-connected vehicles, or the like. Depending on the location of individual UEs, UE 110 may use RF to communicate with various BSs of cellular network 120. BS 121 may include an RU (e.g., RU 125-1) and a DU (e.g., DU 127-1). Two BSs 121 (BS 121-1 and BS 121-2) are illustrated. BS 121-1 can include: structure 115-1, RU 125-1, and DU 127-1. Structure 115-1 may be any structure to which one or more antennas (not illustrated) of the BS are mounted. Structure 115-1 may be a dedicated cellular tower, a building, a water tower, or any other man-made or natural structure to which one or more antennas can reasonably be mounted to provide cellular coverage to a geographic area. Similarly, BS 121-2 can include: structure 115-2, RU 125-2, and DU 127-2.

Real-world implementations of system 100 can include many (e.g., thousands) of BSs and many CUs and 5G core 139. BS 121-1 can include one or more antennas that allow RUs 125 to communicate wirelessly with UEs 110. RUs 125 can represent an edge of cellular network 120 where data is transitioned to RF for wireless communication. The radio access technology (RAT) used by RU 125 may be 5G NR, or some other RAT. The remainder of cellular network 120 may be based on an exclusive 5G architecture, a hybrid 4G/5G architecture, or some other cellular network architecture that supports cellular network slices.

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. In some embodiments, an RU can also operate on three bands. One or more DUs, such as DU 127-1, may communicate with CU 129. Collectively, an RU, DU, and CU create a gNodeB, which serves as the radio access network (RAN) of cellular network 120. DUs 127 and CU 129 can communicate with 5G core 139. The specific architecture of cellular network 120 can vary by embodiment. Edge cloud server systems (not illustrated) outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible virtualized implementation, CU 129, 5G core 139, and/or orchestrator 138 can be implemented virtually as software being executed by general-purpose computing equipment on a cloud-computing platform 128, as detailed herein. Therefore, depending on needs, the functionality of a CU, and/or 5G core may be implemented locally to each other and/or specific functions of any given component can be performed by physically separated server systems (e.g., at different server farms). For example, some functions of a CU may be located at a same server facility as where 5G core 139 is executed, while other functions are executed at a separate server system or on a separate cloud computing system. In the illustrated embodiment of system 100, cloud-computing platform 128 can execute CU 129, 5G core 139, and orchestrator 138. The cloud-computing platform 128 can be a third-party cloud-based computing platform or a cloud-based computing platform operated by the same entity that operates the RAN. Cloud-based computing platform 128 may have the ability to devote additional hardware resources to cloud-based cellular network components or implement additional instances of such components when requested.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new DU for test, orchestrator 138 can perform a pipeline of calling the DU code from a software repository incorporated as part of, or separate from cellular network 120, pulling corresponding configuration files (e.g. helm charts), creating Kubernetes nodes/pods, loading DU containers, configuring the DU, and activating other support functions (e.g. Prometheus, instances/connections to test tools). While this instantiation of a DU may be triggered by orchestrator 138, a chaos test system may introduce false DU container images in the repo, may introduce latency or memory issues in Kubernetes, may vary traffic messaging, and/or create other "chaos" in order to conduct the test. That is, chaos test system is not only connected to a DU, but is connected to all the layers and systems above and below a DU, as an example.

Kubernetes, Docker®, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The traditional OSS/BSS stack exists above orchestrator 138. Chaos testing of these components, as well as other higher layer custom-built components. Such components can be required sources of information and agents for testing at the service/app/solution layer. One aim of chaos testing is to verify the business intent (service level objectives (SLOs) and SLAs) of the solution. Therefore, if we commit to a SLA with certain key performance indicators (KPIs), chaos testing can allow measuring of whether those KPIs are being met and assess resiliency of the system across all layers to meeting them.

A cellular network slice functions as a virtual network operating on an underlying physical cellular network. Operating on cellular network 120 is some number of cellular network slices, such as hundreds or thousands of network slices. Communication bandwidth and computing resources of the underlying physical network can be reserved for individual network slices, thus allowing the individual network slices to reliably meet defined SLA requirements. By controlling the location and amount of computing and communication resources allocated to a network slice, the QoS and QoE for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular parameters that can be set for a cellular network slice can include: uplink bandwidth per UE; downlink bandwidth per UE; aggregate uplink bandwidth for a client; aggregate downlink bandwidth for the client; maximum latency; access to particular services; and maximum permissible jitter.

Particular network slices may only be reserved in particular geographic regions. For instance, a first set of network slices may be present at RU 125-1 and DU 127-1, a second set of network slices, which may only partially overlap or may be wholly different from the first set, may be reserved at RU 125-2 and DU 127-2.

Further, particular cellular network slices may include multiple defined slice layers. Each layer within a network slice may be used to define parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 2:
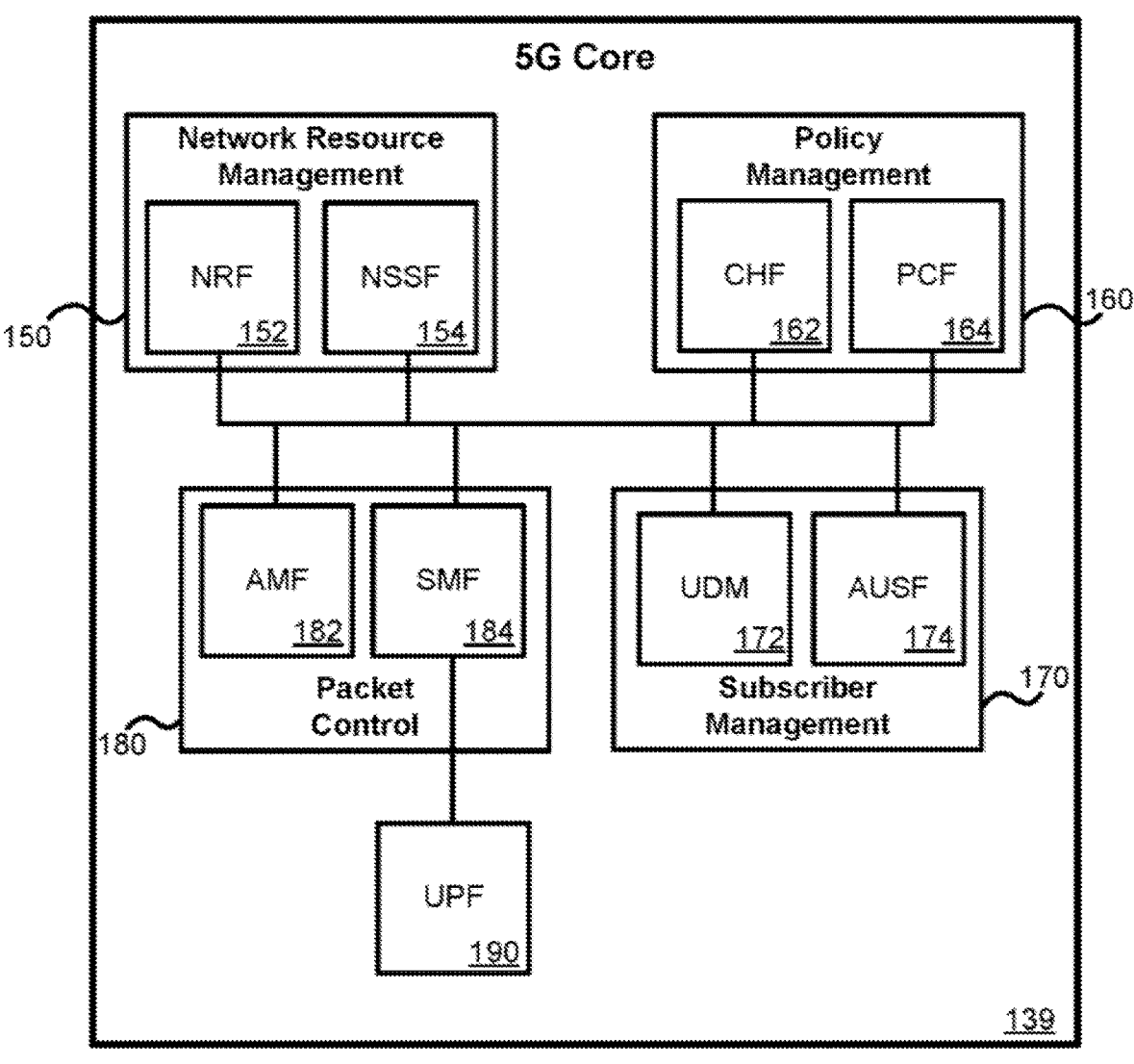
FIG. 2 illustrates an embodiment of a 5G Core.

FIG. 2 illustrates a block diagram of a cellular network core, which can represent 5G core 139. 5G core 139 can be implemented on a cloud-computing platform. 5G core 139 can be physically distributed across data centers, or located at a central national data center (NDC), and can perform various core functions of the cellular network. 5G core 139 can include: network resource management components 150; policy management components 160; subscriber management components 170; and packet control components 180. Individual components may communicate on a bus, thus allowing various components of 5G core 139 to communicate with each other directly. 5G core 139 is simplified to show some key components. Implementations can involve additional other components.

Network resource management components 150 can include: Network Repository Function (NRF) 152 and Network Slice Selection Function (NSSF) 154. NRF 152 can allow 5G network functions (NFs) to register and discover each other via a standards-based application programming interface (API). NSSF 154 can be used by AMF 182 to assist with the selection of a network slice that will serve a particular UE.

Policy management components 160 can include: Charging Function (CHF) 162 and Policy Control Function (PCF) 164. CHF 162 allows charging services to be offered to authorized network functions. Converged online and offline charging can be supported. PCF 164 allows for policy control functions and the related 5G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UE.

Packet control components 180 can include: Access and Mobility Management Function (AMF) 182 and Session Management Function (SMF) 184. AMF 182 can receive connection- and session-related information from UE and is responsible for handling connection and mobility management tasks. SMF 184 is responsible for interacting with the decoupled data plane, creating updating and removing Protocol Data Unit (PDU) sessions, and managing session context with the User Plane Function (UPF).

User plane function (UPF) 190 can be responsible for packet routing and forwarding, packet inspection, QoS handling, and external PDU sessions for interconnecting with a Data Network (DN) 195 (e.g., the Internet) or various access networks 197. Access networks 197 can include the RAN of cellular network 120 of FIG. 1A.

The functions illustrated in FIG. 2 as part of 5G core 139 are merely exemplary. Many more or different functions may be implemented in the cellular network core and may vary by slice. The amount of computing resources devoted to a particular function can vary by slice.

Figure 3:
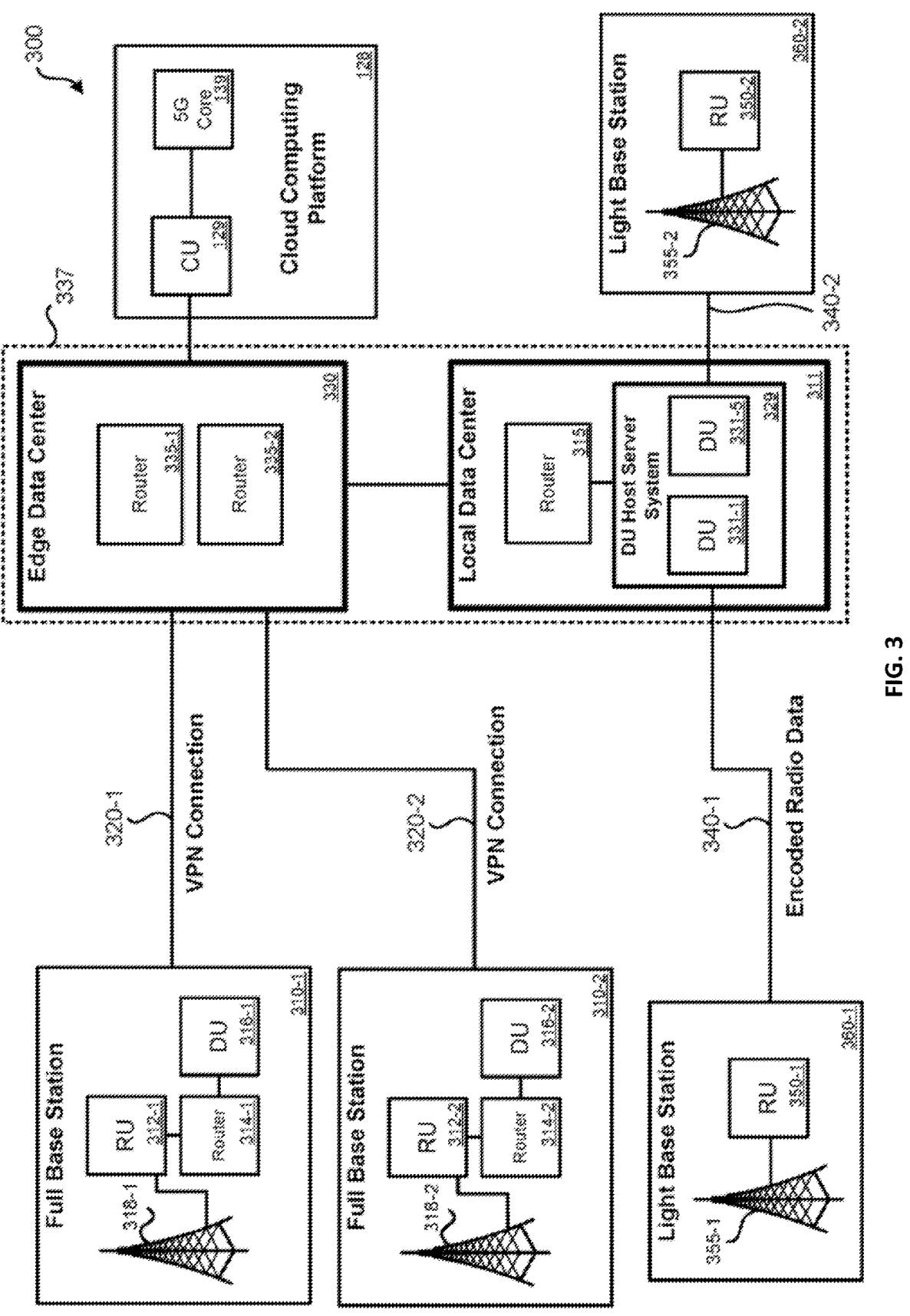
FIG. 3 illustrates an embodiment of a hybrid cloud cellular network architecture.

FIG. 3 illustrates an embodiment of hybrid cellular network system 300 ("system 300") that includes hybrid use of local and remote DUs in communication with a cloud computing platform that hosts the cellular network core. System 300 can include: LDC 311; light BSs 360; full BSs 310; VLAN connections 320; edge data center 330 ("EDC 230"); CU 129; and 5G core 139, which are executed on cloud computing platform 128. In system 300, some base stations, referred to as "full base stations," have DUs implemented locally at each BS. In contrast, a "light base station" includes structure (e.g., structures 355) and a local radio unit (e.g., RUs 350), but a DU implemented remotely at a geographically separated LDC. In system 300, either light BSs 360 or full BSs 310 may be referred to as a cell site.

LDC 311 can serve to host DU host server system 329, which can host multiple DUs 331 which are remote from corresponding light base stations 360. For example, DU 331-1 can perform the DU functionality for light base station 360-1. DUs with DU host server system 329 can communicate with each other as needed.

LDC 311 can be connected with EDC 330. In some embodiments, LDC 370 and EDC 330 may be co-located in a same data center or are relatively near each other, such as within 250 meters. EDC 330 can include multiple routers, such as routers 335, and can serve as a hub for multiple full BSs 310 and one or more LDCs 311. EDC 330 may be so named because it primarily handles the routing of data and does not host any RAN or cellular core functions. In a cloud-computing cellular network implementation at least some components, such as CU 129 and functions of 5G core 139, may be hosted on cloud computing platform 128. EDC 330 may serve as the past point over which the cellular network operator maintains physical control; higher-level functions of CU 129 and 5G core 139 can be executed in the cloud. In other embodiments, CU 129 and 5G core 139 may be hosted using hardware maintained by the cellular network provider, which may be in the same or a different data center from EDC 330.

Full BSs 310, which include on-site DUs 316, may connect with the cellular network through EDC 330. A full BS, such as full BS 310-1, can include: RU 312-1; router 314-1; DU 316-1; and structure 318-1. Router 314-1 may have a connection to a high bandwidth communication link with EDC 330. Router 314-1 may route data between DU 316-1 and EDC 330 and between DU 316-1 and RU 312-1. In some embodiments, RU 312-1 and one or more antennas are mounted to structure 318-1, while router 314-1 and DU 316-1 are housed at a base of structure 318-1. Full BS 310-2 functions similarly to full BS 310-1. While two full BSs 310 and two light BSs 360 are illustrated in FIG. 3, it should be understood that these numbers of BSs are merely for exemplary purposes; in other embodiments, the number of each type of BS may be greater or fewer.

While encoded radio data is transmitted via the fiber optic connections 340 between light BSs 360 and LDC 370, connection 320-1 between full BSs 310 and EDC 330 may occur over a fiber network. For example, while the connection between light BS 360-1 and LDC 370 can be understood as a dedicated point-to-point communication link on which addressing is not necessary, full BS 310-1 may operate on a fiber network on which addressing is required. Multiprotocol label switching (MPLS) segment routing (SR) may be used to perform routing over a network (e.g., fiber optic network) between full BS 310-1 and EDC 330. Such segment routing can allow for network nodes to steer packetized data based on a list of instructions carried in the packet header. This arrangement allows for the source from where the packet originated to define a route through one or more nodes that will be taken to cause the packet to arrive at its destination. Use of SR can help ensure network performance guarantees and can allow for network resources to be efficiently used. Other full BSs may use the same types of communication link as full BS 310-1. While MPLS SR can be used for the network connection between full BSs 310 and EDC 330, it should be understood that other protocols and non-fiber-based networks can be used for connections 320.

For communications across connection 320-1, a virtual local area network (VLAN) may be established between DU 316-1 and EDC 330, when a fiber network that may also be used by other entities is used. The encryption of this VLAN helps ensure the security of the data transmitted over the fiber network.

Since light BSs 360 are relatively close to LDC 370, typically in a dense urban environment, use of a dedicated point-to-point fiber connection can be relatively straightforward to install or obtain (e.g., from a network provider that has available dark fiber or fiber on which bandwidth can be reserved). However, in a less dense environment, where full BSs 310 can be used, a point-to-point fiber connection may be cost-prohibitive or otherwise unavailable. As such, the fiber network on which MPLS SR is performed and the VLAN connection is established can be used instead. Further, the total amount of upstream and/or downstream data from a light BS to an LDC may be significantly greater than the amount of upstream and/or downstream data from a DU of a full BS to EDC 337, thus requiring a dedicated fiber optic connection to satisfy the bandwidth requirements of light BSs.

To perform chaos testing, a small portion of the cellular network can be simulated and tested, followed by larger portions of the cellular network as needed to verify functionality and robustness. Once satisfied as to performance in a test environment, testing can be performed in a restricted production environment, followed by release into the general production environment. On each of these levels, some amount of chaos testing can be performed.

Improvements

FIG. 4 illustrates a logical diagram of a system to determine a geolocation of a communications tower, according to various embodiments.

A system 400 to determine a geolocation of a communications tower (not shown) may begin by obtaining a cell ID of a cell providing communication services to a UT (not shown). The communications tower includes structures 115 of FIG. 1 and structures 318 of FIG. 3. The system 400 may be included in subscriber management 170 of FIG. 2. The cell ID of the cell serving the UT may be included in a Call Data Record (CDR) of subscriber management 170.

The system 400 may be divided into a data source layer 402, a processing layer 410 and a presentation layer 420. The data source layer 402 may include a CDR cell ID 404, a cell ID tower database 406 and a non-cell ID tower database 408. In some embodiments, records of the cell-ID tower database 406 may be enhanced and corroborated with records of the non-cell-ID tower database 408. The enhancements may be saved in a large scale data storage 416. The non-cell-ID tower database 408 may include geolocation records for all tower sites in a geographic area, for example, a country, for example, the United States. Records of the non-cell-ID tower database 408 do not have any cell IDs associated with the tower sites. A large scale data storage 416 may plot the tower sites in the non-cell-ID tower database 408.

In the processing layer 410, given geolocations (latitudes and longitudes) of the tower sites from the non-cell-ID tower database 408 and a geolocation provided by the cell ID tower database 408 for a particular cell ID, a geo join 412 for these geolocations may be performed. When a cell's latitude and longitude is within a desired radius of the tower site's latitude and longitude, that cell may be associated and/or matched with that tower site. The enhanced and corroborated cell site geolocation may be recorded as a single dot on a map. The enhanced and corroborated cell site geolocation data may be pushed into the large-scale data storage 416, for example, a data science platform such as SnowFlake from Dataiku. When a geolocation for a particular cell ID cannot be determined by the geo join 412, triangulation 414 may be used to determine a geolocation for the particular cell ID. In some embodiments, the triangulation 414 may use the geolocations of a previous cell ID and a following cell ID of the UT associated with the CDR of the particular cell ID.

In the presentation layer 420, the pushed data may be used to attribute usage to a geolocation and aggregate it to get a "Roaming %" for the particular cell ID.

FIG. 5 illustrates a logical flow diagram of a system to determine a geolocation of communications tower included in a cellular network according to various embodiments.

A system 500 to determine a geolocation of communications tower included in a cellular network is disclosed. The system 500 may include an operation 506 to retrieve records from the cell ID tower database 504 matching the cell ID 502, for example, using a join operation between the cell ID 502 with the cell ID tower DB 504.

The system 500 may include an operation 508. Operation 508 checks the results of operation 506. When operation 506 retrieves a match, operation 508 proceeds to operation 510. When operation 506 fails to retrieve a match, operation 508 proceeds to a triangulation operation 520.

Operation 510 to retrieve records from the non-cell ID tower database 512 matching the geolocation retrieved by operation 506 for the tower in question, for example, using a geo join between the geolocation and the non-cell ID tower database 512. The join of operation 506 or operation 510 may be database query, for example, a relational query, a vector query, a geo query. A Geo join, sometimes defined as a visual recipe, performs a join between two (or more) datasets based on multiple geospatial matching conditions. Join clauses can be chained together to perform join operations on many input datasets.

The system 500 may include an operation 514. Operation 514 checks the results of operation 510. When operation 510 retrieves a match, operation 514 provides the geolocation 516 provided by operation 510 to a union operation 522. When operation 510 fails to retrieve a match, operation 514 provides the geolocation 518 provided by operation 510 to the union operation 522.

Triangulation operation 520 may find a midpoint between a previous cell ID location and following cell ID location. Triangulation operation 520 essentially takes the calculated midpoint as the cell ID latitude and longitude in 508 and then running through the process as if the midpoint identified in triangulation operation 520 was a known cell ID latitude and longitude in 504. In the triangulation operation 520, the previous and following cell IDs may be determined by traversing the CDR. After the midpoint is determined the non-cell ID tower database 512 is queried for a tower site within a desired radius of the latitude and longitude of the midpoint. If no tower site is retrieved from non-cell ID tower database 512 within the desired radius, then the midpoint is added as a tower site by assigning a site-id to the midpoint latitude and longitude. The triangulation operation 520 output may be provided to the union operation 522.

The union operation 522 may unite/combine the output of triangulation operation 520, operation 506 and/or operation

510. The union operation 522 may associate the cell ID with the union of the geolocations and save the association to a large scale data storage 524.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

I claim as my invention:

1. A method for determining a latitude and a longitude of a communication tower, the method comprising:

receiving a cell ID for a network cell from a data record;

querying one or more geolocation data sources for a geolocation of the communication tower using the cell ID;

when the querying fails to retrieve the geolocation based on the cell ID, setting the geolocation to be between a previous cell ID geolocation and a following cell ID geolocation;

associating the cell ID with the communication tower based on the geolocation; and pushing an association of the cell ID and the geolocation into a large-scale data storage using a data processing platform.

2. The method of claim 1, further comprising:

representing the geolocation geographically on a map; and attributing a usage to a roaming partner based on the cell ID in data records and aggregating the usage to get a roaming percentage.

3. The method of claim 1, wherein the cell ID for the network cell is included in a Call Data Record (CDR).

4. The method of claim 3, wherein the setting comprises:

determining a previous cell ID and a following cell ID from the CDR, retrieving the previous cell ID geolocation and the following cell ID geolocation, and setting the geolocation to a midpoint of the previous cell ID geolocation and the following cell ID geolocation.

5. The method of claim 1, wherein one of the one or more geolocation data sources comprises records associated with cell IDs.

6. The method of claim 1, wherein one of the one or more geolocation data sources comprises records not associated with cell IDs, and the querying the one of the one or more geolocation data sources is based on an estimated latitude and an estimated longitude of the communication tower.

7. The method of claim 1, wherein the one or more geolocation data sources comprise a geolocation data source comprising the cell ID.

8. The method of claim 1, wherein the one or more geolocation data sources comprises multiple geolocation data sources and the method further comprising uniting the geolocation from the multiple geolocation data sources to form the geolocations of the pushing.

9. The method of claim 8, wherein a first data source of the multiple geolocation data sources comprises first records associated with cell IDs, wherein a second data source of the multiple geolocation data sources comprises second records not associated with the cell IDs, and the querying comprises querying the first records with the cell ID and querying the second records based on a first data source latitude and a first data source longitude.

10. The method of claim 1, wherein the communication tower belongs to a roaming partner.

11. A system to determine a latitude and a longitude of a communication tower, the system comprising a data processing platform configured to:

receive a cell ID for a network cell from a data record;

query one or more geolocation data sources for a geolocation of the communication tower using the cell ID;

when the query fails to retrieve the geolocation based on the cell ID, set the geolocation to be between a previous cell ID geolocation and a following cell ID geolocation;

associate the cell ID with the communication tower based on the geolocation; and push the geolocation into a large-scale data storage.

12. The system of claim 11, wherein the data processing platform is further configured to represent the geolocation geographically on a map; and attribute a usage to a roaming partner based on the cell ID in data records and aggregating the usage to get a roaming percentage.

13. The system of claim 11, wherein the cell ID for the network cell is included in a Call Data Record (CDR).

14. The system of claim 13, wherein the data processing platform is further configured to determine a previous cell ID and a following cell ID from the CDR, retrieve the previous cell ID geolocation and the following cell ID geolocation, and set the geolocation to a midpoint of the previous cell ID geolocation and the following cell ID geolocation.

15. The system of claim 11, wherein one of the one or more geolocation data sources comprises records associated with cell IDs.

16. The system of claim 11, wherein one of the one or more geolocation data sources comprises records not associated with cell IDs, and the data processing platform is further configured to query the one of the one or more geolocation data sources based on an estimated latitude and an estimated longitude of the communication tower.

17. The system of claim 11, wherein the one or more geolocation data sources comprise a geolocation data source comprising the cell ID.

18. The system of claim 11, wherein the one or more geolocation data sources comprises multiple geolocation data sources and the data processing platform is further configured to unite the geolocation from the multiple geolocation data sources to form the geolocations of the push.

19. The system of claim 18, wherein a first data source of the multiple geolocation data sources comprises first records associated with cell IDs, wherein a second data source of the multiple geolocation data sources comprises second records not associated with the cell IDs, and the data processing platform is further configured to query the first records with the cell ID and query the second records based on a first data source latitude and a first data source longitude.

20. The system of claim 11, wherein the communication tower belongs to a roaming partner.

* * * * *